(12) United States Patent
Gallant et al.

(10) Patent No.: US 7,110,538 B2
(45) Date of Patent: Sep. 19, 2006

(54) METHOD FOR ACCELERATING CRYPTOGRAPHIC OPERATIONS ON ELLIPTIC CURVES

(75) Inventors: Robert Gallant, Mississauga (CA); Robert Lambert, Cambridge (CA); Scott A. Vanstone, Campbellville (CA)

(73) Assignee: Certicom Corp., Mississauga (CA)

(*) Notice: Subject to any disclaimer, the term of this patent is extended or adjusted under 35 U.S.C. 154(b) by 277 days.

(21) Appl. No.: 09/885,959

(22) Filed: Jun. 22, 2001

(65) Prior Publication Data

US 2002/0044649 A1    Apr. 18, 2002

Related U.S. Application Data

(63) Continuation of application No. PCT/CA99/01222, filed on Dec. 23, 1999.

(30) Foreign Application Priority Data

Dec. 24, 1998   (CA) .................................... 2257008

(51) Int. Cl.
*H04K 1/00*       (2006.01)
*H04L 9/00*       (2006.01)
*H04L 9/28*       (2006.01)

(52) U.S. Cl. ....................................................... 380/28
(58) Field of Classification Search ................... 380/28
See application file for complete search history.

(56) References Cited

U.S. PATENT DOCUMENTS 5,999,626 A * 12/1999 Mullin et al. ............... 713/172

6,243,467 B1 * 6/2001 Reiter et al. ................... 380/30

OTHER PUBLICATIONS

Lercier, Finding Good Random Elliptic Curves for Cryptosystems Defined over Finite Fields, 1997, Springer, Advances in Cryptography—Eurocrypt '97, vol. 1233, pp. 379-392.*

Alfed J. Menezes, Handbook of Applied Cryptography, CRC Press, 1997, pp. 613, 614, 618.*

Volker Mueller, Fast Multiplication on Elliptic Curves over Small Fields of Characteristic Two, URL: ftp://ftp.informatik.tu-damstadt.de/pub/TI/reports/vmueller.jc.ps.gz, Jun. 30, 1997, pp. 1-19, Darmstadt, Germany.

Jung Hee Cheon, Sungmo Park, Sangwoo Park, and Daeho Kim, Two Efficient Algorithms for Arithmetic of Elliptic Curves Using Frobenius Map, Public Key Cryptography First International Workshop on Practice and Theory in Public Key Cryptography PKC 98, 1998, pp. 195-202, Springer-Verlag, New York.

Jerome A. Solinas, An Improved Algorithm for Arithmetic on a Family of Elliptic Curves, Advances in Cryptology Crypto 97, 1997, pp. 357-271, Springer-Verlag, New York.

Neal Koblitz, CM-Curves With Good Cryptographic Properties, Advances in Cryptography Crypto 91, 1991, pp. 279-287, Springer-Verlag, New York.

* cited by examiner

*Primary Examiner*—Gilberto Barron, Jr.
*Assistant Examiner*—Benjamin E. Lanier
(74) *Attorney, Agent, or Firm*—John R. S. Orange; Brett J. Slaney; Santosh K. Chari (57) ABSTRACT

This invention provides a method for accelerating multiplication of an elliptic curve point $Q(x,y)$ by a scalar k, the method comprising the steps of selecting an elliptic curve over a finite field Fq where q is a prime power such that there exists an endomorphism $\Psi$, where $\Psi(Q)=\lambda.Q$ for all points $Q(x,y)$ on the elliptic curve: and using smaller representations $k_i$ of the scalar k in combination with the mapping $\Psi$ to compute the scalar multiple of the elliptic curve point Q.

18 Claims, 3 Drawing Sheets

METHOD FOR ACCELERATING CRYPTOGRAPHIC OPERATIONS ON ELLIPTIC CURVES

This application is a continuation of International Application No. PCT/CA99/01222, filed on Dec. 23, 1999, and claims the priority of Canadian Patent Application No. 2,257,008, filed on Dec. 24, 1998, the content of all of which is incorporated herein by reference.

This invention relates to a method for performing computations in cryptographic systems utilizing elliptic curves.

BACKGROUND OF THE INVENTION

A public-key data communication system may be used to transfer information between a pair of correspondents. At least part of the information exchanged is enciphered by a predetermined mathematical operation by the sender and the recipient may perform a complementary mathematical operation to decipher the information.

Each correspondent has a private key and a public key that is mathematically related to the private key. The relationship is such that it is not feasible to determine the private key from knowledge of the public key. The keys are used in the transfer of data, either to encrypt data that is to be transferred or to attach a signature to allow verification of the authenticity of the data.

For encryption, one correspondent uses the public key of the recipient to encrypt the message and sends it to the recipient The recipient then uses her private key to decipher the message.

A common key may also be generated by combining one parties public key with the other parties private key. It is usual in such cases to generate new private and corresponding public keys for each communication session, usually referred to as session keys or ephemeral keys, to avoid the long-term keys of the parties being compromised.

The exchange of messages and generation of the public keys may therefore involve significant computation involving exponentiation when the cryptographic system utilizes in $Z^*p$, the finite field of integers mod p where p is a prime or the analogous operation of point multiplication when the system utilizes an elliptic curve. In an elliptic curve system, an ephemeral key pair is obtained by generating a secret integer, k and performing a point multiplication in the seed point Q to provide the ephemeral public key kQ. Similarly, the generation of a common ephemeral session key will require multiplication of a public key $k_aQ$, which is a point on the curve, with a secret integer $k_b$ of the other correspondent so that point multiplication is again required.

A similar procedure is used to sign a message except that the sender applies his private key to the message. This permits any recipient to recover and verify the message using the senders public key.

Various protocols exist for implementing such a scheme and some have been widely used. In each case, however, the sender is required to perform a computation to sign the information to be transferred and the receiver is required to perform a computation to verify the signed information.

In a typical implementation a signature component s has the form:

$s=ae+k \pmod{n}$ where; in an elliptic curve crypto system,

P is a point on the underlying curve which is a predefined parameter of the system;

k is a random integer selected as a short term private or session key;

R=kP is the corresponding short term public key;

a is the long term private key of the sender;

Q=aP is the senders corresponding public key;

e is a secure hash, such as the SHA-1 hash function, of a message m and the short term public key R; and n is the order of the curve.

The sender sends to the recipient a message including m, s, and R and the signature is verified by computing the value $R^1=(sP-eQ)$ which should correspond to R. If the computed values correspond then the signature is verified.

In order to perform the verification it is necessary to compute the point multiplications to obtain sP and eQ, each of which is computationally complex. Where the recipient has adequate computing, power this does not present a particular problem but where the recipient has limited computing power, such as in a secure token or a "Smart card" application, the computations may introduce delays in the verification process.

Key generation and signature protocols may therefore be computationally intensive. As cryptography becomes more widely used there is an increasing demand to implement cryptographic systems that are faster and that use limited computing power, such as may be found on a smart card or wireless device.

Elliptic curve cryptography (ECC) provides a solution to the computation issue. ECC permits reductions in key and certificate size that translates to smaller memory requirements, and significant cost savings. ECC can not only significantly reduce the cost, but also accelerate the deployment of smart cards in next-generation applications. Additionally, although the ECC algorithm allows for a reduction in key size, the same level of security as other algorithms with larger keys is maintained.

However, there is still a need to perform faster calculations on the keys so as to speed up the information transfer while maintaining a low cost of production of cryptographic devices.

Computing multiples of a point on an elliptic curve is one of the most frequent computations performed in elliptic curve cryptography. One method of speeding up such computations is to use tables of precomputed multiples of a point. This technique is more useful when a point is known beforehand. However, there are cases when multiples of previously unknown points are required (for example, in ECDSA verification). Thus there is a need for a system and method for facilitating point multiplications.

SUMMARY OF THE INVENTION

In general terms, the present invention represents the scalar k as a combination of components $k_i$ and an integer λ derived from an endomorphism in the underlying curve.

The method is based on the observation that, given an elliptic curve (EC) having complex multiplication mapping over a finite field, there is an λ, which is the solution to a quadratic, for which the complex multiplication mapping is equivalent to multiplying a point Q by λ. It will often be less computationally expensive to compute λQ via the complex multiplication map, compared to treating λ as a integer and performing the EC multiplication. In practice, point multiplication by other scalars (not just λ) is required. It is also shown how the multiplication mapping may be used to compute other multiples of the point.

In accordance with this invention there is provided a method for accelerating multiplication of an elliptic curve point Q(x,y) by a scalar k, the method comprising the steps of:
selecting an elliptic curve over a finite field F such that there exists an endomorphism $\psi$, where $\psi(Q)=\lambda \cdot Q$ for all points Q(x,y) on the elliptic curve; and
using smaller representation $k_i$ of the scalar k in combination with the mapping $\psi$ to compute the scalar multiple of the elliptic curve point Q.

BRIEF DESCRIPTION OF THE DRAWINGS

These and other features of the preferred embodiments of the invention will become more apparent in the following detailed description in which reference is made to the appended drawings wherein.

DETAILED DESCRIPTION OF THE PREFERRED EMBODIMENTS

Figure 1:
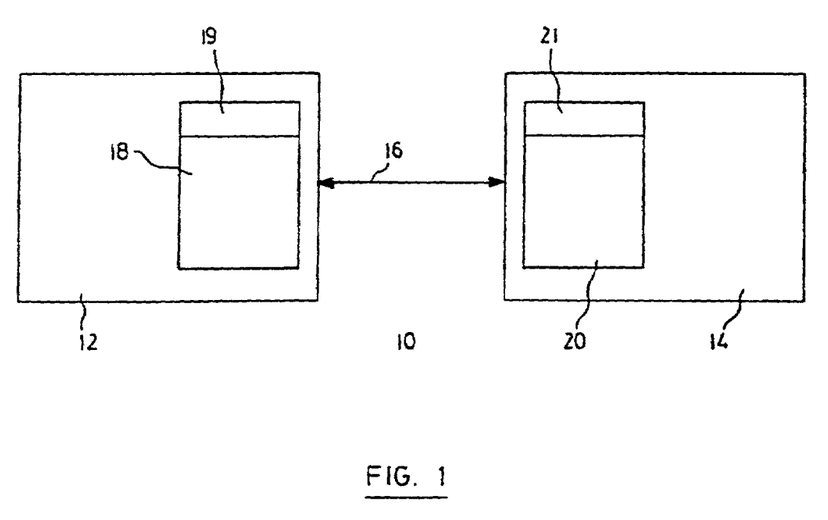
FIG. 1 is a schematic diagram of a communication system.

For convenience in the following description, like numerals refer to like structures in the drawings. Referring to FIG. 1, a data communication system 10 includes a pair of correspondents, designated as a sender 12, and a recipient 14, connected by a communication channel 16. Each of the correspondents 12,14 includes a cryptographic processor 18,20 respectively that may process digital information and prepare it for transmission through the channel 16 as will be described below. Each of the correspondents 12,14 also includes a computational unit 19,21 respectively to perform mathematical computations related to the cryptographic processors 18,20. The processors 18,20 may be embodied in an integrated circuit incorporated in the processor or may be implemented as instructions encoded on a data carrier to implement a predetermined protocol in conjunction with a general purpose processor. For the purpose of illustration it will be assumed that the correspondent 12 is in the form of a smart card having a dedicated processor 18 with relatively limited computing power. The processor 20 may be a central server communicating with the card by channel 16 and channel 16 may be a wireless communication channel if preferred.

The cryptographic processors 18 implement an elliptic curve cryptographic system, of ECC, and one of the functions of the cryptographic processor 18 is to perform point multiplications of the form k·Q, where k is an integer and Q a point on the underlying elliptic curve, so that they may be used as a key pair k, kQ in a cryptographic scheme. As noted above, cryptographic computations such as the multiplication of an elliptic curve point by a scalar value are computationally expensive.

Figure 2:
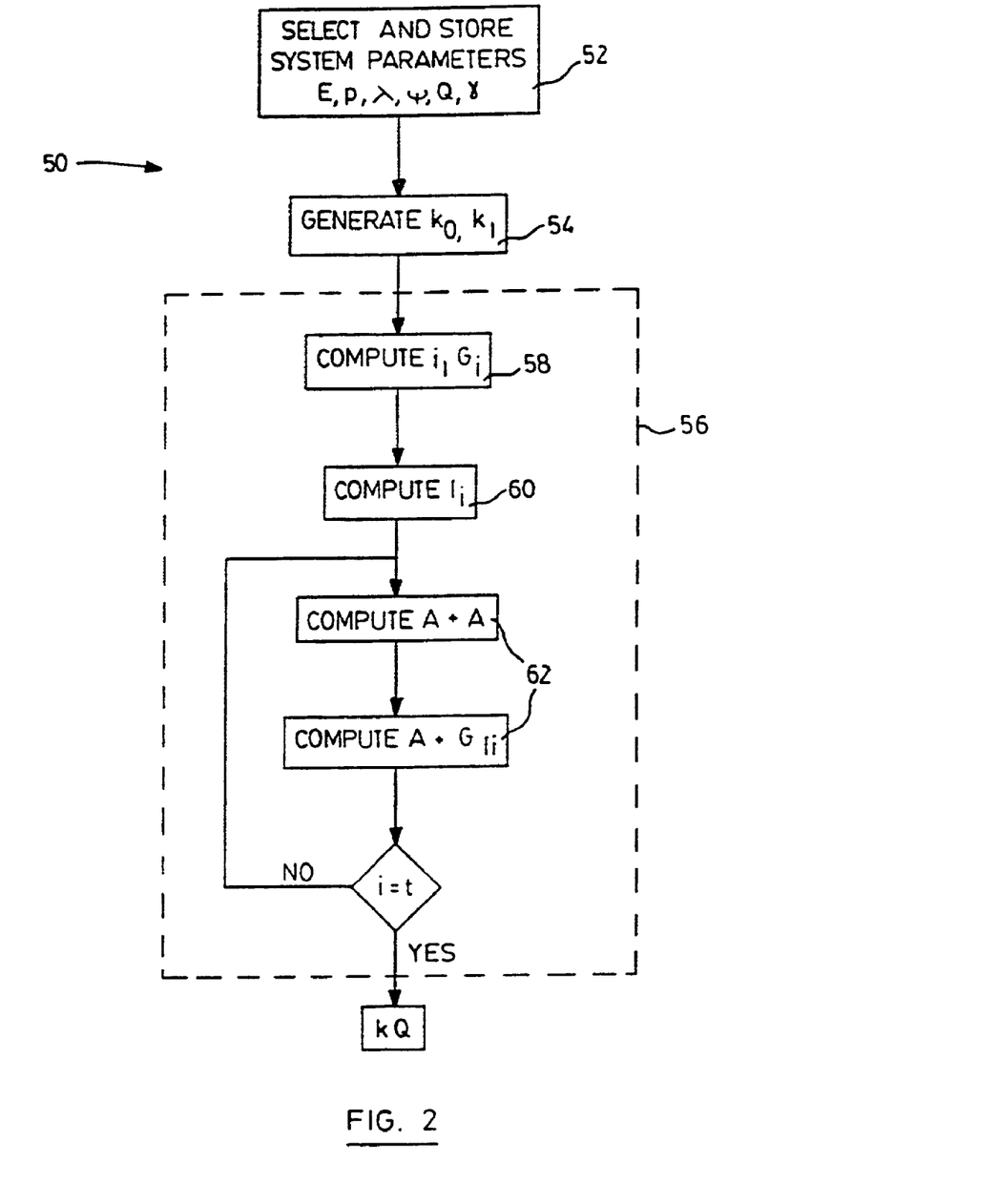
FIG. 2 is a flow chart showing the steps of implementing a first embodiment of the present invention.

A method for accelerating scalar multiplication of an elliptic curve point Q(x,y) is shown in FIG. 2 and indicated generally by the numeral 50. The subject algorithm increases the speed at which the processors 12 can for example sign and verify messages for specific classes of elliptic curves. The method is based on the observation that given the general equation for an elliptic curve E:

$$y^2 + a_1 xy + a_3 y = x^3 + a_2 x^2 + a_4 x + a_6 \quad (1)$$

over a finite field, exemplified as $F_q$ (q is a prime power) and when there exists an endomorphism $\psi$, where $\psi(Q)=\lambda \cdot Q$ for all points Q(x,y) on the elliptic curve, then multiplication of the point Q by an integer k may be accelerated by utilizing combinations of smaller representations $k_i$ of k in combination with the mapping $\psi$. The mapping $\psi$ also allows precomputation of group elements and combinations thereof, which may be used in subsequent calculation of kQ.

Referring now to FIG. 2, a flow chart of a general embodiment for accelerating point multiplication on an elliptic curve, is shown by numeral 50. The system parameters are first selected. As an initial step an underlying elliptic curve E is selected to have certain characteristics. In a first embodiment of the invention the generalized elliptic curve (1) may be expressed in the following form:

$$E: y^2 = x^3 + b \bmod p; \text{ where } p \text{ is a prime.} \quad (2)$$

Firstly, the modulus p can be determined such that there is a number, $\gamma$ where $\gamma \in F_p$ ($F_p$ is the field of size p consisting of all integers mod p), and $\gamma^3 \equiv 1$ mod p (a cube root of unity). If for example p=7, then $\gamma$=2, since $2^3$ mod 7=1. Such a $\gamma$ does not necessarily exist for all p, and therefore this must be taken into consideration when choosing the value of p. Typically, the chosen p should be at least 160 bits in length for adequate cryptographic strength.

After the curve E has been selected, a mapping function $\psi$ is determined. The mapping function $\psi$: (x, y)→($\gamma$x, y), simply maps one set of points on the curve to another set of points on the curve. There exists an integer $\lambda$ such that $\psi(Q)=\lambda \cdot Q$ for all points Q(x,y) of interest on the elliptic curve, E. This integer $\lambda$ may be found by noting that $\lambda^3 \equiv 1$ mod n, where n is the number of points on the elliptic curve E over $F_p$ i.e. the number of points on $E(F_p)$. There may exist more than one solution for $\lambda$ in $\lambda^3 \equiv 1$ mod n, but only one of those solutions will satisfy the mapping function $\psi$. It is important to note that since $\gamma^3$ mod p=1, both Q and $\psi$(Q) satisfy the equation for E. Therefore, instead of having to perform lengthy calculations to determine the results of multiplication by $\lambda$, it can be done very efficiently using the results of the mapping function so that multiplication by $\lambda$ can be done very efficiently.

A seed point Q is selected and the system parameters E, p, Q, $\lambda$, $\psi$(Q), and $\gamma$ are stored in the card 12, as indicated at 52, at manufacture time for use by the cryptographic processor 18. To implement a cryptographic procedure such as encryption, key agreement or signature it is necessary to select an integer k for use as an ephemeral private key k and generate a corresponding public key kQ.

The value of k may be expressed as:

$$k = (k_0 + k_1 \lambda) \bmod n \quad (3)$$

where n is the number of points on $E(F_p)$ and $k_0$ and $k_1$ are integers. The point k·Q then becomes:

$$k \cdot Q = (k_0 Q + k_1 \lambda Q) \bmod n \quad (4)$$

For some cryptographic operations the value of k may be chosen at random and in these cases, rather than select k it is possible to select values for $k_0$ and $k_1$ at random, having a length of $[\log_2 (n)]/2$ not including sign bits, (i.e. the length of the $k_1$'s are chosen to be at least one half the length k) and then calculate the value for k using equation (3). Having selected the values of $k_0$, $k_1$ as indicated a 54 in FIG. 2, the right side of equation (4) can be calculated quickly using an algorithm analogous to the "Simultaneous Multiple Exponentiation" as described in the "Handbook of Applied Cryptography"(HAC) by Menezes et. al.(Algorithm 14.88) and indicated at 56. For convenience the algorithm is reproduced below. It may be noted that in an additive group exponentiation is analogous to addition, thus replacing the multiplication in the algorithm with addition, yields the following:

---
Algorithm 1 Simultaneous Multiple Addition
---
INPUT: group
elements $g_0, g_1, \ldots, g_{l-1}$ and non negative t-bit integers $e_0, e_1, \ldots, e_{l-1}$.
OUTPUT: $g_0 e_0 + g_1 e_1 + \ldots + g_{l-1} e_{l-1}$.
    step1. Precomputation. For i from 0 to $(2^l - 1)$:
        $G_i \leftarrow \Sigma_{j=0}^{l-1} g_j i_j$
        where $i = (i_{l-1} \ldots i_0)_2$
    step2. $A \leftarrow 0$
    step3. For i from 1 to t do the following:
        $A \leftarrow A + A, A \leftarrow A + G_{I_i}$,
    step4. Return (A)     where $A = g_0 e_0 + g_1 e_1 + \ldots + g_{l-1} e_{l-1}$ Applying this algorithm to equation (4) it can be seen that there are two group elements, $g_0, g_1$ namely Q and $\lambda Q$, so that l=2 and two integers $e_0, e_1$ namely $k_0, k_1$. The algorithm permits precomputation of some of the values and initially $G_i$ is precomputed. The results of precomputation of $G_i$ with l=2 is shown in table 1.

TABLE 1

| i | 0 | 1 | 2 | 3 |
|---|---|---|---|---|
| $G_i$ | 0 | $g_0$ | $g_1$ | $g_0 + g_1$ |

After performing a point addition to construct the point: $Q+\psi(Q)$. It is possible to fill in table 1 with the computed elements to yield table 2. These elements may be precomputed and stored in memory as shown at step 58 in FIG. 2.

TABLE 2

| i | 0 | 1 | 2 | 3 |
|---|---|---|---|---|
| $G_i$ | 0 | Q | $\psi(Q)$ | $Q + \psi(Q)$ |

Before step of the algorithm can be performed, $G_{I_i}$ has to be determined and accordingly $I_1$ through $I_t$ have to be found as indicated at 60. A notional matrix or combing table may be constructed using the binary representation of $k_i$. If, for example, $k_0=30$ and $k_1=10$, then t has the value five since the maximum number of bits in the binary representation of ko through $k_1$ is five and the notional matrix constructed from their binary representation is shown in Table 3. $I_i$ is determined by the number represented in the $i^{th}$ column where the first row contains the least significant bit, the second row contains the next significant bit, etc. Therefore it can be seen from table 3 that $I_1=I_2=(11)=3$, $I_3=(01)=1$, $I_4=3$, and $I_5=0$.

TABLE 3

| i | 1 | 2 | 3 | 4 | 5 |
|---|---|---|---|---|---|
| $k_0$ | 1 | 1 | 1 | 1 | 0 |
| $k_1$ | 0 | 1 | 0 | 1 | 0 |
| $I_i$ | 1 | 3 | 1 | 3 | 0 |

All the components needed to complete the algorithm are available and the iteration of step three is performed as shown at 62.

Initially $A \leftarrow O$ and i is set to 1.

$I_i=I_1$ which from table 3 is equal to 1. $G_{I_1}$ is therefore $G_1$ which from table 2 is Q. The value of A from the iteration for I=1 is therefore O+Q=Q.

For the next iteration where i=2 the initial value of A is Q so $A \leftarrow Q+Q=2Q$ $I_i=I_2=3$ from table 3. $G_{I_2}$ therefore equates to $G_3$ from table 2 which is $Q+\psi(Q)$.

$A+G_{I_1}$ therefore is computed as $2Q+Q+\psi Q=3Q+Q$.

The iterations continue for each value of i set out in table 4 until after the $5^{th}$ iteration the value for koq=k, $\lambda Q$, i.e. kQ is computed.

TABLE 4

| i | A |
|---|---|
| 1 | Q |
| 2 | $3Q + \psi(Q)$ |
| 3 | $7Q + 2\psi(Q)$ |
| 4 | $15Q + 5\psi(Q)$ |
| 5 | $30Q + 10\psi(Q)$ |

Each iteration requires a point doubling (A+A) and a point addition ($A+G_{I_i}$) although in some cases the value of $G_{I_i}$ may be O that will reduce the computation.

Thus it may be seen that this method will require a number of point doubles equal to max $\{\log_2(k_i)\}$, and almost as many point additions. The number of point additions can be reduced using windowing (Alg. 14.85 HAC) and exponent recoding techniques. Since the value of i and $G_i$ can be precomputed, the point additions are easily performed by retrieving the appropriate precomputed element $G_i$ from table 2. Once kP has been computed, it may be used as the correspondents 12 ephemeral public key in encrypting or signing transmissions over the channel 16.

To summarize, for cryptographic operations like encryption and Diffie-Hellman, signature, an integer k is required with a corresponding public key kQ, computed. The values $k_0$ and $k_1$ are chosen at random, each having a length one half the length of n and the term $k_0 Q = k_1 \lambda Q$ generated using a suitable algorithm. When the k's are chosen in this way, the method seems to be as secure as the random generation of k itself. Of course it is possible to choose the $k_i$'s to have fewer bits in order to improve efficiency.

In the above technique, the method of writing $k=k_0+k_1\lambda$ in conjunction with simultaneous combing achieves a speed up of the simultaneous multiple addition algorithm. The technique of writing $k=k_0+k_1\lambda$ may also be used with the scalar multiplication techniques to advantage, namely with winding, combing, etc.

For some mappings $\psi$, it is also possible to use more than two sub k's. It is possible for some $\psi$'s to write $k=k^0+k_1\lambda+k_2\lambda^2$ allowing the value of k to be computed by applying the simultaneous multiple addition algorithm.

In a second embodiment of the invention a different form of the generalized elliptic curve equation (1) is used, namely:

$$y^2=(x^3-ax) \bmod p \qquad (5)$$

Once again, p will be a prime number having at least 160 bits. For this type of curve, the properties required for y are different. It is now required to find a value such that $\gamma^2=-1$ mod p. A change in the property of $\gamma$ requires a different mapping function $\psi'$ to be used. In this embodiment the mapping takes the form $\psi': (x, y) \rightarrow (-x, \gamma y)$. If (x,y) is on the curve, then $\psi'(x,y)$ is also on the curve. In this case $\lambda^4 \equiv 1$ mod n (n is still the number of points on $E(F_p)$), and therefore $\lambda$ can be calculated. The mapping $\psi'(Q)=\lambda \cdot Q$ is performed as before and once again multiplication by λ can be done very efficiently for this curve. The equation for k in this embodiment is the same as in the first embodiment and is represented by:

$$k = (k_0 + k_1 \lambda) \bmod n \quad (6)$$

This equation is the same as in the previous embodiment, having only two group elements. Thus using the group elements Q and Q+ψ'(Q) in the algorithm 1, the point k·Q may be calculated. This computation will require a number of point doubles equal to max $\{\log_2(k_i)\}$, and a similar number of point additions. As described earlier the number of point additions can be reduced using windowing and exponent recoding techniques.

This method applies to other elliptic curves, so long as there exists an efficiently computable endomorphism, ψ.

The above embodiments assume that k can be chosen at random and therefore $k_0$ and $k_1$ can be selected instead and determine k. For cryptographic protocols, where it is not possible to choose k, it is first necessary to find $k_0$, $k_1$ of the desired "short" form from the given value of k such that $k = (k_0 + k_1 \lambda) \bmod n$. In some cases, more than two k's can be used to advantage.

As may be seen in the embodiments described above when a point is known beforehand, tables can be built to speed multiplication. However, there are cases when multiples of previously unknown points are required (for example, this can occur in ECDSA verification) and it is then necessary to take the value of k as provided and then determine suitable representations for $k_i$.

Figure 3:
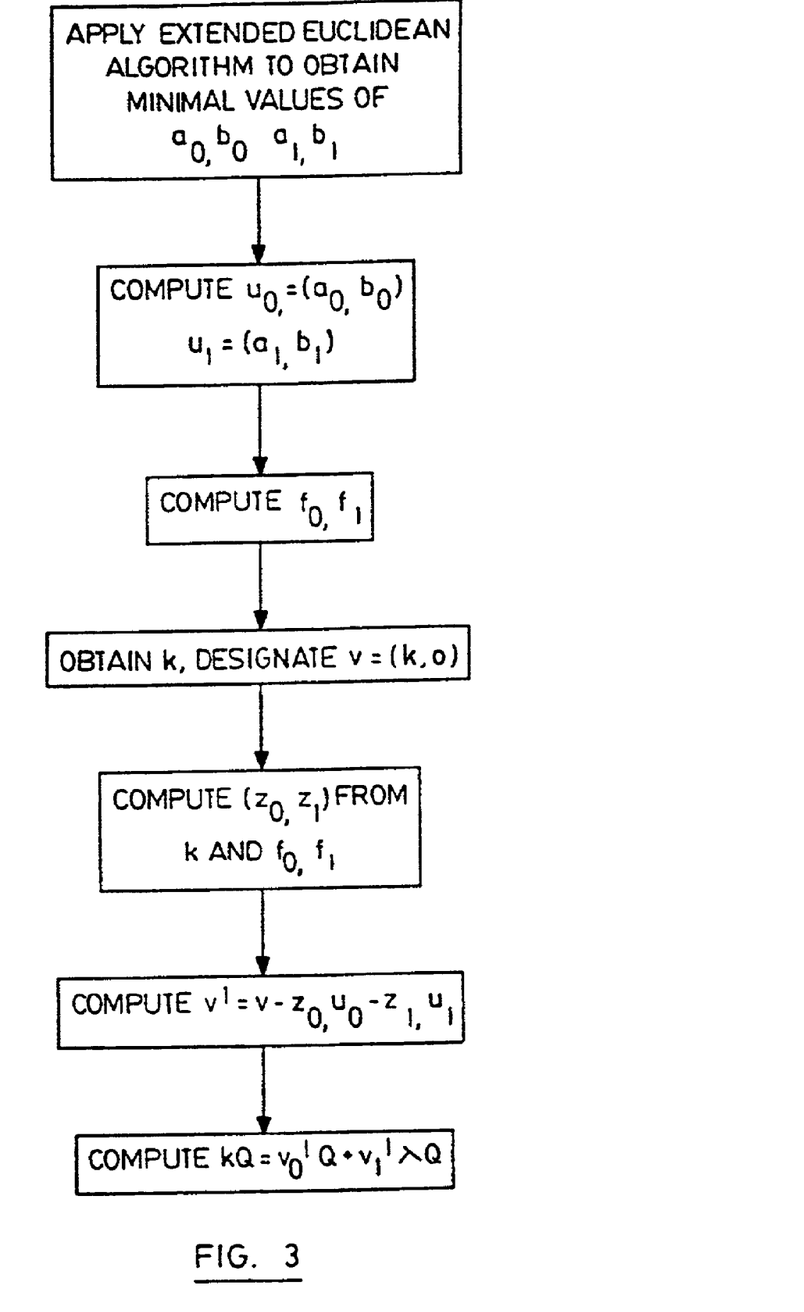
FIG. 3 is a flow chart showing the steps of providing parameters required to implement the method of FIG. 2.

Thus in a third embodiment, system parameters and a value k is provided, the point Q, the required multiple k, and the complex multiplication multiple λ are known. It is necessary to determine the "short" $k_i$'s from the value for k, which is predetermined. A method for doing this described as follows and illustrated in the flow chart of FIG. 3. As a pre-computation (not requiring k) we compute two relations:

$$a_0 + b_0 \lambda \equiv 0 \bmod n$$

$$a_1 + b_1 \lambda \equiv 0 \bmod n$$

such that $a_i$ and $b_i$ are numbers smaller than n. It is preferable that $a_i$ and $b_i$ are as small as possible, however, the present method has advantages even when $a_i$ and $b_i$ are not minimal. The pair, $a_i$ and $b_i$, where $a_i$ and $b_i$ are both small, can be viewed as a vector, $u_i$ with a small Euclidean length. Typically the method described below produces $k_0$ and $k_1$ having representations one half the size of the original k.

In the present embodiment, kQ can be computed efficiently by utilizing precomputed, short vector representations to obtain an expression of the form:

$$k_0 Q + \lambda k_1 Q$$

This is accomplished by using precomputed vectors to derive fractions $f_0$ and $f_1$ that do not require knowledge of k. A vector z is generated from the combination of fractions $f_0$ and $f_1$ and k. The vector z is used to calculate a second vector v' where v'=(v0',v1') and the value of kQ calculated as $$v_0' Q + \lambda v_1' Q \quad (8)$$

The method of achieving this solution is described below in greater detail.

To produce small $a_i$, and $b_i$, it is possible to make use of the $L^3$-lattice basis reduction algorithm (HAC p. 118), which would directly result in short basis vectors. However, in this preferred embodiment the simple extended Euclidean algorithm is employed on the pair (n, λ). The extended Euclidean algorithm on (n, λ) produces linear combinations $c_i n + d_i \lambda = r_i$, where the representation of $r_i$ (e.g. bit-length) decreases and the representation of $c_i$ and $d_i$ increases with i.

The two smallest values of $|(d_i, r_i)|$ resulting from using the extended Euclidean algorithm are saved. The size of these vectors are measured with the squared Euclidean norm $|(d_i, r_i)| = d_i^2 + r_i^2$. The terms in these minimal relations are denoted $\hat{d}_0$, $\hat{r}_0$ and $\hat{d}_1$, $\hat{r}_1$. and will typically occur in the middle of the algorithm. Even if the minimal relations are not retained, suboptimal relations may still give the method an advantage in the calculation of point multiples.

The values of $a_i$ and $b_i$ are constructed by defining $a_0 = -\hat{r}_0$, $b_0 = \hat{d}_0$ a $b_1 = \hat{d}_0$ all of which may be precomputed. The next task is to find a small representation for the multiple k.

Given the computation of $a_0$, $b_0$ and $a_1$, $b_1$, it is possible to designate the vectors $u_0$, u1, where $u_0 = (a_0, b_0)$ and $u_1 = (a_1, b_1)$. These vectors satisfy $a_i + b_i \lambda \equiv 0 \pmod{n}$. The multiplication of the group elements Q by the vector $v = (v_0, v_1)$ is defined as $(v_0 + v_1 \lambda) Q$. Since $a_i + b_i \lambda \equiv 0 \pmod{n}$, $u_0 R = u_1 R = 0$ for any group element R. Hence for any integers $z_0$ and $z_1$, $v'R = (v - z_0 u_0 - z_1 u_1) R$ for any group element R.

Integers $z_0$ and $z_1$ may be chosen such that the vector $v' = v - z_0 u_0 - z_1 u_1$ has components that are as small as possible. Again, this method will have an advantage if the components of v' are small, but not necessarily minimally so.

The appropriate $z_0$ and $z_1$ are calculated by converting the basis of v into the basis $\{u_0, u_1\}$. The conversion between basis involves matrix multiplication. To convert the vector $v = (v_0, v_1)$ from the $\{u_0, u_1\}$ basis to the standard orthonormal basis $\{(1,0),(0,1)\}$, $$v_{\{(1,0),(0,1)\}} = v_{(u_0, u_1)} M = (v_0, v_1) \begin{bmatrix} a_0 & b_0 \\ a_1 & b_1 \end{bmatrix}$$

To convert in the other direction, from the standard orthonormal basis $\{(1,0),(0,1)\}$ to the $(u_0, u_1)$ basis, the multiplication is simply by the inverse of M, $$v_{(u_0, u_1)} = v_{\{(1,0),(0,1)\}} inverse(M) = v_{\{(1,0),(0,1)\}} \frac{1}{a_0 b_1 - a_1 b_0} \begin{bmatrix} b_1 & -b_0 \\ -a_1 & a_0 \end{bmatrix}$$

Since the vector v=(k, 0) has a zero component, the bottom row of inverse(M) is not required, and therefore to convert to the $\{u_0, u_1\}$ basis only the fractions $$f_0 = \frac{b_1}{a_0 b_1 - a_1 b_0} \text{ and } f_1 = \frac{b_0}{a_0 b_1 - a_1 b_0}$$

are needed.

The fractions $f_0$ and $f_1$ may be precomputed to enough precision so that this operation may be effected only with multiplication. It should be noted that the computations leading to these fractions do not depend upon k, therefore they can be computed once when the elliptic curve is chosen as a system parameter, and do not need to be recalculated for each k. Similarly the vectors v, $u_0$ and $u_1$ may be precomputed and stored.

Once a value of k is selected or determined the value of kQ may be computed by first calculating $z = (z_0, z_1)$, where z is defined as $(z_0, z_1)=(\text{round}(kf_0), \text{round}(kf_1))$. Other vectors near to z will also be useful, therefore rounding could be replaced with floor or ceiling functions or some other approximation.

Once a suitable z has been determined, an efficient equivalent to v (k,0) is calculated by $v'=(v_0', v_1')=v-z_0u_0-z_1u_1$. The phrase "efficient equivalen" implies a vector $v'$ such that $v'P=vP$ and $v'$ has small coefficients. The value kQ is then calculated as $v_0'Q+v_1'\lambda Q$. This value can be calculated using simultaneous point addition as described above, with enhanced efficiency obtained from the use of non-adjacent form (NAF) recoding as described above and as described in H. A. C. 14.7 at page 627. Thus, even where k is predetermined, values of $k_0$ and $k_I$ can be computed and used with the mapping function to obtain a value of kQ and hus he key pair k, kQ.

For the case where k is to be separated into 3 portions $k=k_0+k_1\lambda+k_2\lambda^2$, small vectors can be obtained from $L^3$-row-reducing $$\begin{bmatrix} 1 & 0 & -\lambda^2 \\ 0 & 1 & -\lambda \\ 0 & 0 & -n \end{bmatrix} \text{ to } \begin{bmatrix} u_2 \\ u_1 \\ u_0 \end{bmatrix}$$

A small vector equivalent (three-dimensional row) can be obtained in a similar way to the two-dimensional case.

Using these methods to determine the value of k·Q greatly reduces the processing power required by the cryptographic processors 12. It also increases the speed at which these repetitive calculations can be done which, in turn, reduces the time to transfer information.

It will be appreciated that once the scalar multiple k has been represented in terms of shortened components $k=k_0+k_1\lambda+k_2\lambda^2+ \ldots k_{m-1}\lambda^{m-1}$, other options for efficient elliptic curve scalar multiplication may be used in place of or in conjunction with the simultaneous multiple addition algorithm. These options include windowing (fixed and sliding), combing, bit recoding and combinations of these techniques.

One particularly beneficial technique permits tables built for one component of the multiplication, say $k_0$, to be reused for other components $k_1$, etc. This is accomplished by transforming the computed table elements by applying the mapping $\gamma$ as required.

As a further exemplification, an embodiment where k can be recast as $k=k_0+k_1\lambda+k_2\lambda^2$, where k has m-bits and $k_i$ have roughly m/3 bits is described below.

Once the components $k_i$ have been determined, they may be recoded from the binary representation to the signed binary representation having less non-zero bits. This recoding can take the Non-Adjacent-Form (NAF), where every 1 or −1 bit in the representation if $k_i$ is non-adjacent to another non-zero in the signed binary string. This recoding is described in H.A.C. 14.7 p. 627.

Once each $k_i$ has been recoded, a table can be constructed to aid in computing $k_i\lambda^iP$.

A NAF windowing table precomputes certain short-bit length multiples of $\lambda^iP$. The width of the window determines the size of the table. As $k_i$ has been recorded to have no adjacent non zeros, odd window widths are suitable. A 3-bit wide NAF window would contain

| 1 | 101 | 10-1 |

The recoded $k_i$ values are built by concatenating these windows, and padding where necessary with zeros (H.A.C., p. 616).

The required number of additions can be reduced with use of this table, since it is necessary to add or subtract an EC point only for every window encountered instead of for every non zero bit.

Initially therefore this technique is applied to the computation of $k_0P$.

The table built for the $k_0P$ calculation can be applied to the $k_1\lambda P$ calculation if the table elements are mapped with the $\psi$ mapping using the operator $\gamma$. Similarly, $k_2\lambda^2 P$ can be accelerated by using the table built for $k_0P$, but mapping the table elements with $\gamma^2$.

In applying the sliding window technique to the components, only one set of doublings need be performed.

To illustrate this example of a preferred embodiment the following example will be used:

If $k=[10110101101]_2+[111010101101]_2\lambda$, then recoding $$k = [10-100-10-100-101]+[1000-10-10-10-101]\lambda,$$

$$= k_0' + k_1'\lambda$$

A 3-bit window table on P is precomputed containing 1·P, [10−1]·P, [101]·P. This requires two EC additions, and two EC doublings.

After this, kP can be calculated as $kP=[10-100-10-100-101]P+[1000-10-10-10-101]\cdot\lambda P$ by adding/subtracting elements from the table.

This can be done using an accumulator A as follows:

| | |
|---|---|
| A←0 | ;initialize |
| A += $\psi$ (1 · P) | ;consuming the top bit of $k_0^r$ |
| A ← 2A | ;double A |
| A ← 2A | |
| A ← [10 − 1] P | ;consuming the top 3 bits of $k_0^r$ |
| A ← $2^4$A | ; |
| A −= [101] $\psi$ P | ;consuming a 3 bit window of $k_1^r$ |
| A ← 2A | ;double A |
| A −= [101] P | ;consuming 3 bits of $k_1^r$ |
| A ← $2^4$A | |
| A −= [101] $\psi$ P | ;consuming 3 bits of $k_1^r$ |
| A ← $2^2$A | |
| A −= [10 − 1] P | ;consuming the last of $k_0^r$ |
| A += $\psi$ P | ;producing kP. |

In summary, the previously described technique is as follows. Given an elliptic curve E and an endomorphism $\psi$, there corresponds an integer $\lambda$ such that $\lambda Q=\psi(Q)$ for all points $Q\in E$. Select an integer m and compute an equivalent number m of "short basis vectors" $b_1, b_2, \ldots, b_m$. Each such basis vector corresponds to an integer, and each such integer is divisible by the number of points $n=\#E(F_p^m)$ (i.e. the number of points). Now, given an integer k, (0<k<n), we write $k=\Sigma k_i \cdot \lambda^i$, where the $k_i$'s are chosen to be "short". This is done by finding the difference between a certain vector (which represents k) and a nearby vector in the lattice generated by $b_1, b_2, \ldots, b_m$.

The following embodiment explicitly describes an application of the previously described technique (endomorphism and basis conversion and "Shamir's trick") to elliptic curves defined over composite fields. In particular, we describe an application to curves $E(F_p^m)$ where p is an odd prime is described. The following embodiments exemplify techniques for such curves.

This technique is described in the case where the map $\psi$ is the Frobenius map $\psi(x,y)=(x^p,y^p)$ and $E'_{A,B}(F_p^m)$ wherein $A, B \in Fp$.

In this case, it is known that the Frobenius map satisfies the $\psi^2-t\psi+p=0$, where $t=p+1-\#E(F_p^m)$.

It follows that $\lambda^2-t\lambda+p=0 \bmod n$ and so $\lambda^{2+i}-t\lambda^{1+i}+p\lambda^i=0 \bmod n$.

Note that the vectors;

$$(\lambda^{m-1} \ldots \lambda^2, \lambda^1, \lambda^0)$$

$b_1$ (0, 0, 0, ...   0, 1, $-t$, $p$)
$b_2$ (           1, $-t$, $p$, 0)
      (1, $-t$, $p$, 0, 0, ...   ..., 0)
      ($-t$, $p$, 0, 0, ...   ..., 0, 1)
$b_m$ ($p$, 0, 0, 0, ...   0, 1, $-t$)

consist of m "short" basis vectors of the vector space $Q^n$. It follows that to compute k·Q on such a curve we can proceed using the vectors $b_1, b_2 \ldots b_m$ and the technique described previously.

In the above embodiments it will be appreciated that k,$\lambda$Q can be obtained from $\psi$(kQ) is the mapping is more efficient than addition.

Although the invention has been described with reference to certain specific embodiments, various modifications thereof will be apparent to those skilled in the art without departing from the spirit and scope of the invention as outlined in the claims appended hereto.

We claim:

1. A method for multiplying an elliptic curve point Q(x,y) by a scalar k to provide a point kQ, the method comprising the steps of:
   a) selecting an elliptic curve of order n over a finite field F such that there exists an endomorphism $\psi$ where $\psi$ (Q)=$\lambda$(Q) for all point Q (x,y) on the elliptic curve, and $\lambda$ is an integer;
   b) establishing a representation of said scalar k as a combination of components $k_i$ and said integer $\lambda$ of the form $$k_i = \sum_{i=0}^{i=} k_i \lambda^i$$

mod n;
   c) combining said representation and said point Q to form a composite representation of a multiple of the form $k_0 Q + k_1 \psi(Q) + \ldots$ corresponding to kQ; and
   d) computing a value corresponding to said point kQ from said composite representation of kQ.

2. A method according to claim 1 wherein each of said components $k_i$ is shorter than said scalar k.

3. A method according to claim 1 wherein said components $k_1$ are initially selected and subsequently combined to provide said scalar k.

4. A method according to claim 1 wherein said components $k_i$ are selected at random.

5. A method according to claim 4 wherein said representation is of the form $k_0+k_1\lambda$.

6. A method according to claim 1 wherein said scalar k has a predetermined value and said components $k_0$ and $k_1$ are one half size of said scalar k.

7. A method according to claim 3 wherein said value of said multiple kQ is calculated using simultaneous multiple addition.

8. A method according to claim 7 wherein said simultaneous multiple addition includes precomputing a value $G_i$ representing a grouping of like elements, said value $G_i$ being used in said simultaneous multiple addition.

9. A method according to claim 6 wherein said components $k_i$ are obtained by obtaining short basis vectors ($u_o, u_i$) of the field F, designating a vector v as (k,0), converting v from a standard, orthonormal basis to the ($u_o, u_i$) basis, to obtain fractions $f_0 f_1$ representative of the vector v, applying said fractions to k to obtain a vector z, calculating an efficient equivalent v' in the composite representation of kQ.

10. A method of generating in an elliptic curve cryptosystem a key pair having a integer k providing a private key and a public key kQ, where Q is a point on the curve, the method comprising the steps of:
   a) selecting an elliptic curve over a finite filed F such that there exists an endomorphism $\psi$ where $\psi$ (Q)=$\mu$Q for all points Q (x,y) on the elliptic curve, $\lambda$ is an integer,
   b) establishing a representation of said key k as a combination of components $k_i$ and said integer $\lambda$, of the form $$k_l = \sum_{i=0}^{f=} k_f \lambda^i$$

mod n where n is the number of points on the elliptic curve,
   c) combining said representation and said point Q to form a composite representation of a multiple of the form $k_0+k_1\psi(Q)+\ldots$ corresponding to the public key kQ; and
   d) computing a value corresponding to said public kQ from said composite representation of kQ.

11. A method according to claim 10 wherein each of said components: $k_i$ is shorter than said scalar k.

12. A method according to claim 11 wherein said components $k_i$ are initially selected and subsequently combined to provide said scalar k.

13. A method according to claim 12 said components $k_i$ are selected at random.

14. A method according to claim 13 wherein said representation is of the form $k_0+k_1\lambda$.

15. A method according to claim 10 wherein said scalar k has a predetermined value and said components $k_0$ and $k_1$ are selected to be one half the size of said scalar k.

16. A method according to claim 12 wherein said value of said multiple kQ is calculated using simultaneous multiple addition.

17. A method according to claim 16 wherein said simultaneous multiple addition includes precomputing a value $G_i$ representing a grouping of like elements, said value $G_i$ being used in said simultaneous multiple addition.

18. A method according to claim 15 wherein said components $k_i$ are obtained by obtaining short basis vectors ($u_o$, $u_i$) of the field F, designating a vector v as (k,0), converting v from a standard, orthonormal basis to the ($u_o$, $u_i$) basis, to obtain fractions $f_0 f_1$ representative of the vector v, applying said fractions to k to obtain a vector z, calculating an efficient equivalent v' in the composite representation of kQ.

* * * * *

UNITED STATES PATENT AND TRADEMARK OFFICE
CERTIFICATE OF CORRECTION

PATENT NO.       : 7,110,538 B2
APPLICATION NO.  : 09/885959
DATED            : September 19, 2006
INVENTOR(S)      : Robert Gallant, Robert J. Lambert and Scott A. Vanstone It is certified that error appears in the above-identified patent and that said Letters Patent is hereby corrected as shown below:

In column 6, line 51, replace "$k^0$" with "$k_0$".

In column 7, line 59, replace "(vo',$v_1$')" with "($v_0$',$v_1$')".

In column 7, line 60, replace "$vo^lQ+\lambda v_1^l Q$" with "$v_0'Q+\lambda v_1'Q$".

In column 9, line 40, replace "$k_m \lambda^{m-1}$" with "$k_{m-1}\lambda^{m-1}$".

In column 11, line 51, replace "$\lambda(Q)$" with "$\lambda Q$".

In column 11, line 57, replace "$k_i = \sum_{i=0}^{i=} k_i \lambda_i$" with "$k = \sum_{i=0}^{m-1} k_i \lambda^i \bmod n;$".

In column 11, line 62, delete "mod $n;$".

In column 12, line 4, replace "$k_1$" with "$k_i$".

In column 12, line 21, replace "$u_i$" with "$u_1$".

In column 12, line 23, replace "$u_i$" with "$u_1$".

In column 12, line 24, replace "$f_0 f_1$" with "$f_0$ and $f_1$".

In column 12, line 31, replace "filed F" with "field F".

In column 12, line 32, replace "$\mu Q$" with "$\lambda Q$".

In column 12, line 42, replace "$k_l = \sum_{i=0}^{l=} k_f \lambda_i$" with "$k = \sum_{i=0}^{m-1} k_i \lambda^i \bmod n$".

In column 12, line 44, before "where n is the number of points", delete "mod n".

In column 12, line 53, replace "components:" with "components".

In column 14, line 1, replace "$u_i$" with "$u_1$".

In column 14, line 2, replace "$u_i$" with "$u_1$".

In column 14, line 3, replace "$f_0 f_1$" with "$f_0$ and $f_1$".

Signed and Sealed this
Twelfth Day of February, 2013

Teresa Stanek Rea
*Acting Director of the United States Patent and Trademark Office*